Inventor
Harold E. Stonebraker

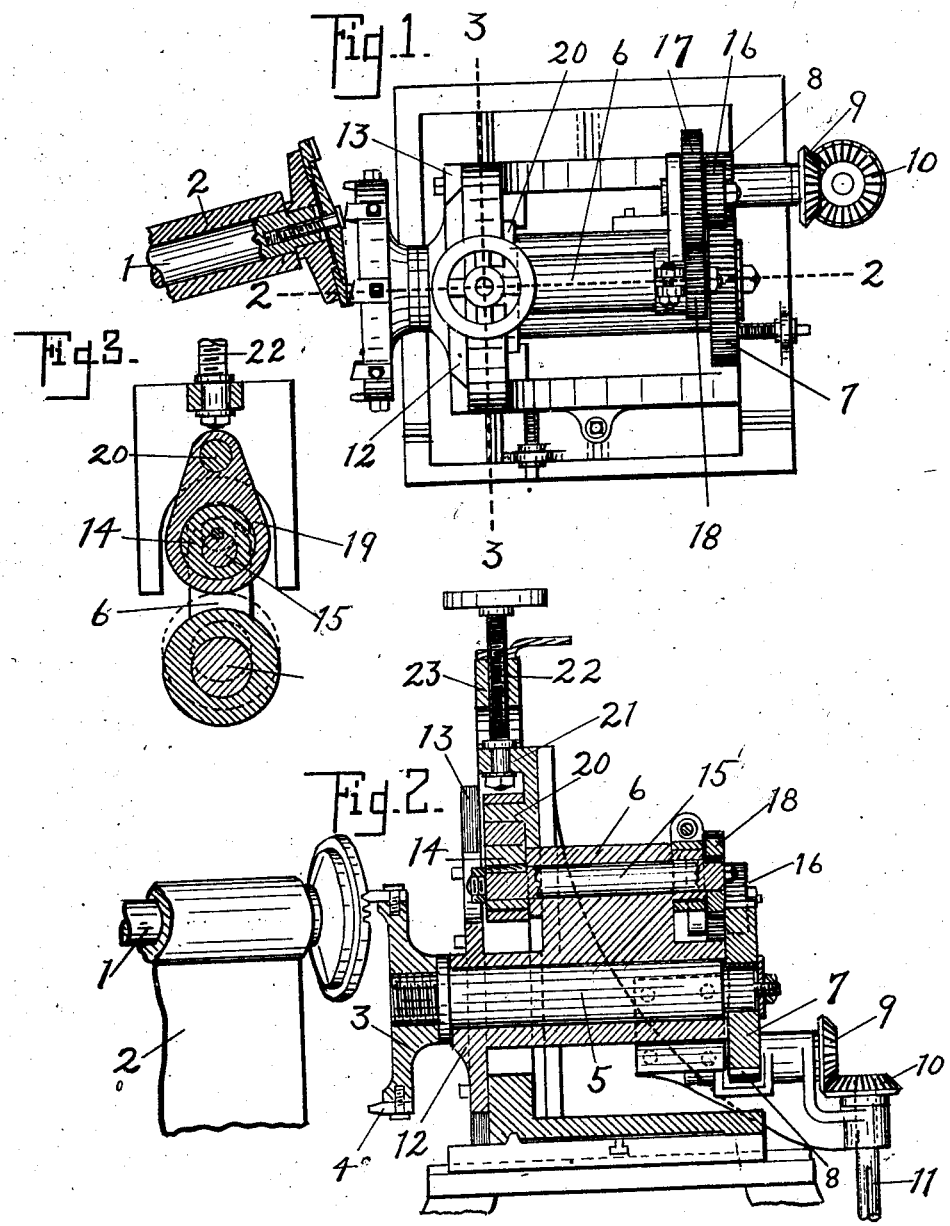

Patented Nov. 1, 1927.

1,647,257

UNITED STATES PATENT OFFICE.

HAROLD E. STONEBRAKER, OF ROCHESTER, NEW YORK.

GEAR-CUTTING MACHINE.

Application filed January 18, 1926. Serial No. 82,018.

This invention relates to a gear generator, more particularly to the cutting of both bevel and spur gears, to obtain a herringbone type of tooth with a generated profile.

One object of the invention is to make it possible to employ a rotary face mill type cutter, and generate a gear tooth having a sharper lengthwise curve than the circle in which the tools are arranged on the cutter head, so that a tooth of pronounced curve can be obtained with a cutter head of relatively large diameter.

Another purpose of the invention is to obtain a herringbone type tooth,—or one with two sharp non-circular curves meeting at a middle point on the gear face,—by means of a rotating, face mill type cutter, permitting of a continuous cutting action, such that one of two successive tools comes into cutting action immediately after the preceding one ceases cutting action, as distinguished from prior types of herringbone gear machines in which reciprocating tools are used.

A further purpose of the invention is to obtain a generated gear with lengthwise curved teeth which conform to non-circular curves and are produced by rotating, face mill type cutters.

An additional purpose of the invention is to afford mechanism in which a rotating face mill type cutter can be used to generate a tooth, the lengthwise curvature of which is a considerably closer approximation of a herringbone tooth than the present so-called spiral or circular tooth gears.

Still another object of the invention is to enable using a rotary face mill type cutter of sufficiently large diameter so that the tools will clear a blank during the non-cutting portion of their travel, and yet cut gear teeth with the same amount of overlap as would result from a cutter of much smaller diameter.

With these accomplishments in view, the invention will be understood from a consideration of the following description in conjunction with the accompanying drawings, the novel features being pointed out in the claims following the description.

In the drawings:

Figure 1 is a plan view of a mechanism incorporating one embodiment of the invention;

Figure 2 is a sectional view on line 2—2 of Figure 1;

Figure 3 is a detail sectional view on line 3—3 of Figure 1;

Figure 4:
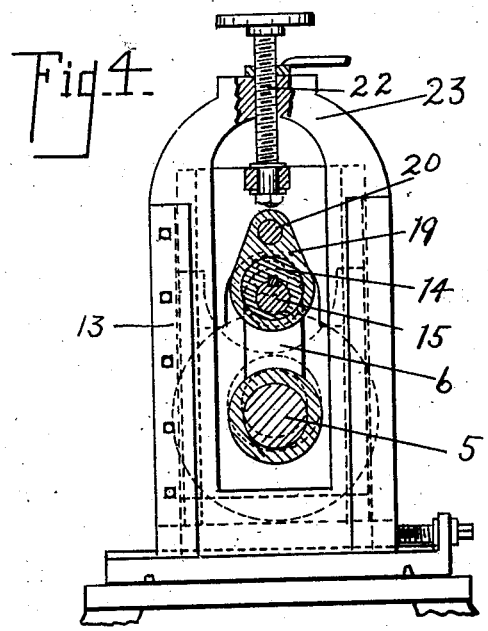
Figure 4 is an end elevation with parts in section.
Figure 5:
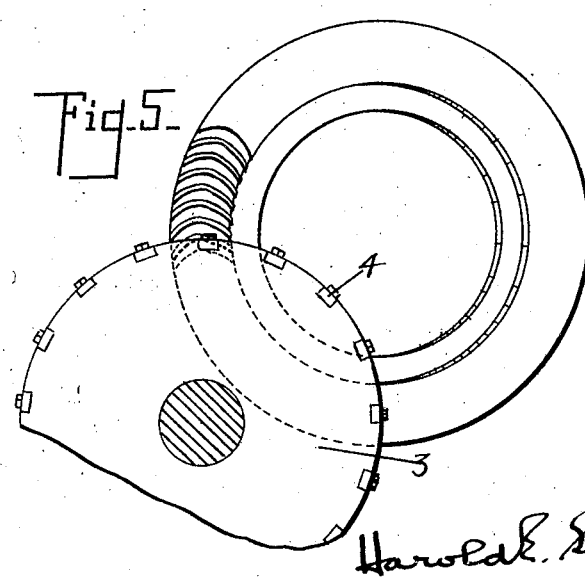
Figure 5 is an elevation of a bevel gear blank showing a cutter in operative relationship, and the general nature of the lengthwise curve of the teeth.

The invention is intended to be used in conjunction with a machine of the principle or general type illustrated in Patent No. 1,325,784, December 23, 1919, or other gear cutting mechanism.

The mechanism herein disclosed is exemplary of various practical adaptations of the invention, which is not limited or confined to the details or arrangements set forth, and in the structure illustrated, 1 designates a blank carrier arranged in a support 2 to which the necessary motion is imparted to roll the blank past the cutter during cutting operations of the tools, corresponding to rolling the blank on a crown gear in the case of bevel gears and on a rack in the case of spur gears, of which a cutting tool represents a tooth.

3 designates a circular face mill type of cutter head having fixed thereon a series of tools 4 which successively engage a given tooth on a blank, the tools being so spaced from each other that one tool is out of cutting action before the succeeding tool commences its cutting operation. The cutter head is mounted on a cutter spindle 5 that is journalled in a support 6 which has an up-and-down movement that will be described presently.

The cutter spindle 5 is driven through a gear 7 fixed to the outer end thereof, which in turn is operated by a pinion 8 on a stubshaft carrying at its outer end a beveled pinion 9. Pinion 9 is engaged and operated by bevel gear 10 on a power shaft 11, which may be driven in any suitable manner, such for instance as illustrated in the prior patent already referred to. The entire unit just described for rotating the cutter spindle 5, including gears 7, 8, 9 and 10 and power shaft 11, is vertically movable with the support 6 and cutter spindle 5, the cutter and spindle being guided during such vertical movement by a guide plate 12 slidable in guides 13.

Any suitable instrumentalities may be used to impart the necessary bodily movement to the cutter head and spindle transversely of their rotary axis, and one possible way of accomplishing this has been disclosed, consisting of an eccentric 14 keyed to the shaft 15 which is journalled in the support 6. The shaft 15 is driven from gear 7 by means of gears 16, 17 and 18, the latter being fixed on shaft 15.

The train of gears 16, 17 and 18 are so related to gear 7 as to cause as many rotations of eccentric 14 during rotation of cutter head 3 as there are tools 4 mounted on the cutter head, or to complete a back and forth bodily movement of the cutter head while an individual tool is crossing the face of a gear blank. The train of gears controlling rotation of eccentric 14, and the arrangement of the eccentric, can be changed in accordance with varying conditions, as for instance where cutter heads of different diameters or with different numbers of tools are employed or where different curvatures are desired.

The eccentric 14 rotates within a housing 19 pivotally supported on a bearing 20 to permit sidewise movement of the housing 19 as the eccentric 14 rotates, thereby effecting a straight up-and-down travel of support 6 and cutter head 3. The bearing 20 on which sleeve 19 is supported is arranged on a supporting plate 21 that is vertically movable and carries a threaded post 22 adjustable in a stationary cross-head 23.

The supporting plate 21 is adjustable up and down for initially setting the cutter in relation to a blank, and after this adjustment is once determined, the extent of the up-and-down bodily movement of the cutter head depends upon the eccentric 14, which preferably rotates once during the interval it takes for a single tool to travel across the face of a gear blank. The support 6 and cutter spindle are preferably reciprocated as already described to impart a bodily movement to the cutter transversely of its axis of rotation, causing each tool to trace on the gear face a compound curve resulting from rotation of the cutter head about an axis, and a bodily movement of the cutter head, preferably reciprocating in a direction transversely of its rotative axis. This combined motion causes each tool as it travels across the face of a gear blank to move in a path approximating a herringbone gear tooth, the complete tooth being composed of two curves on each side of the middle of the gear face connected at the center by a circular arc, which is cut at the moment the cutter head reaches the limit of its bodily travel.

In cutting most gears, both spur and bevel, practical considerations require the use of a cutter head of ten inch diameter or more, and a cutter head of this size does not give as sharp a curve or as much overlap of teeth as is desirable. If a cutter head of sufficiently small diameter is chosen to give a sharp curve or greater overlap, it is either too small to clear the blank or to permit of attaching individual tools thereto in a practical way. With the present invention, these difficulties are avoided, and it is possible to use a cutter head of large enough diameter for all practical purposes, and still obtain a sharp curve with the desired amount of overlap between adjacent teeth, causing a constant and sufficient engagement between two or more teeth of meshing gears.

While an eccentric mechanism has been illustrated for imparting reciprocating action to the cutter head, any equivalent device or means may be employed to accomplish the underlying purpose of moving the cutter and cutter head bodily during rotation, in a direction transversely of its rotative axis, and any modifications or mechanical departures from the structure shown and described herein may be had without departing from the principle of the invention or the scope of the following claims.

I claim:

1. A gear cutting machine comprising a blank carrier, a rotary face mill type cutter head having a series of tools fixed thereon and of sufficiently large diameter to permit the tools to clear a blank during their non-cutting movement, means for rotating the cutter head, and means for effecting continuous cutting of a herringbone type tooth comprising instrumentalities operated by the cutter head rotating means for automatically reciprocating the cutter head transversely to its rotary axis while a tool is moving across a gear face.

2. A gear cutting machine comprising a blank carrier, a rotary face mill type cutter head having a series of tools fixed thereon and spaced so that one tool will clear the blank before the succeeding tool comes into cutting action, means for rotating the cutter head, and means operated by the cutter head rotating means for automatically moving the cutter head bodily in a direction transversely to its rotary axis, while a tool is moving across the face of a blank to cause the tool to travel in a path other than that due to rotation of the cutter head.

In witness whereof, I have hereunto signed my named.

HAROLD E. STONEBRAKER.